April 15, 1952 C. S. ASH 2,592,997
VEHICLE WHEEL
Filed Sept. 20, 1947 3 Sheets-Sheet 1

INVENTOR.
Charles S. Ash
BY
Morgan, Finnegan & Durham
ATTORNEYS.

April 15, 1952 — C. S. ASH — 2,592,997
VEHICLE WHEEL
Filed Sept. 20, 1947 — 3 Sheets-Sheet 2

INVENTOR.
Charles S. Ash
BY
Morgan, Finnegan & Durham
ATTORNEYS.

April 15, 1952   C. S. ASH   2,592,997
VEHICLE WHEEL
Filed Sept. 20, 1947   3 Sheets-Sheet 3

INVENTOR.
Charles S. Ash
BY
Morgan, Finnegan & Durham
ATTORNEYS.

Patented Apr. 15, 1952

2,592,997

UNITED STATES PATENT OFFICE 2,592,997

VEHICLE WHEEL

Charles S. Ash, Milford, Mich.

Application September 20, 1947, Serial No. 775,226

12 Claims. (Cl. 301—13)

1

The present invention relates to a vehicle wheel adapted to demountably mount a pair of tire carrying rims.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
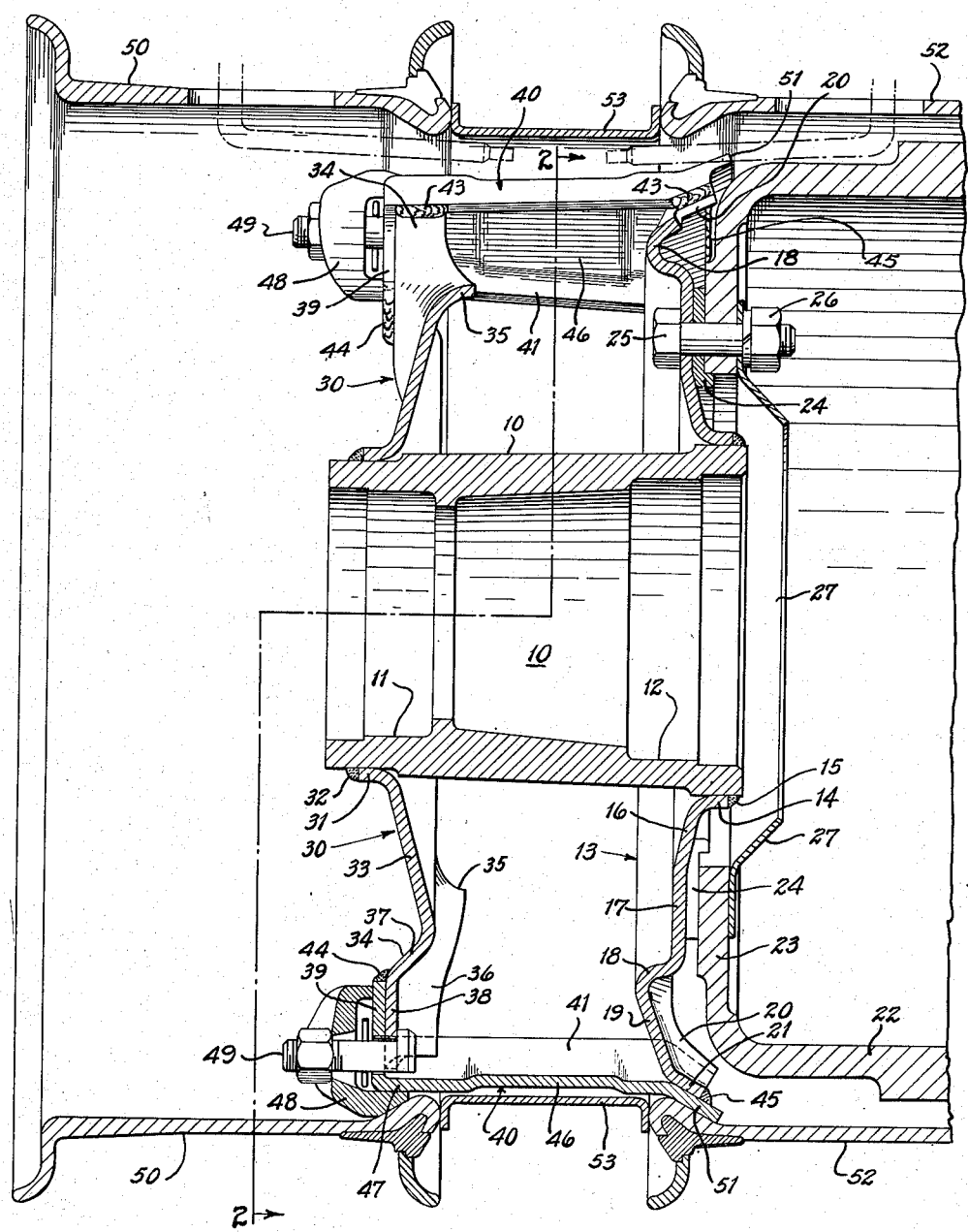
Fig. 1 is a cross-sectional view of a typical and illustrative embodiment of the invention taken on line 1—1 of Fig. 2.
Figure 2:
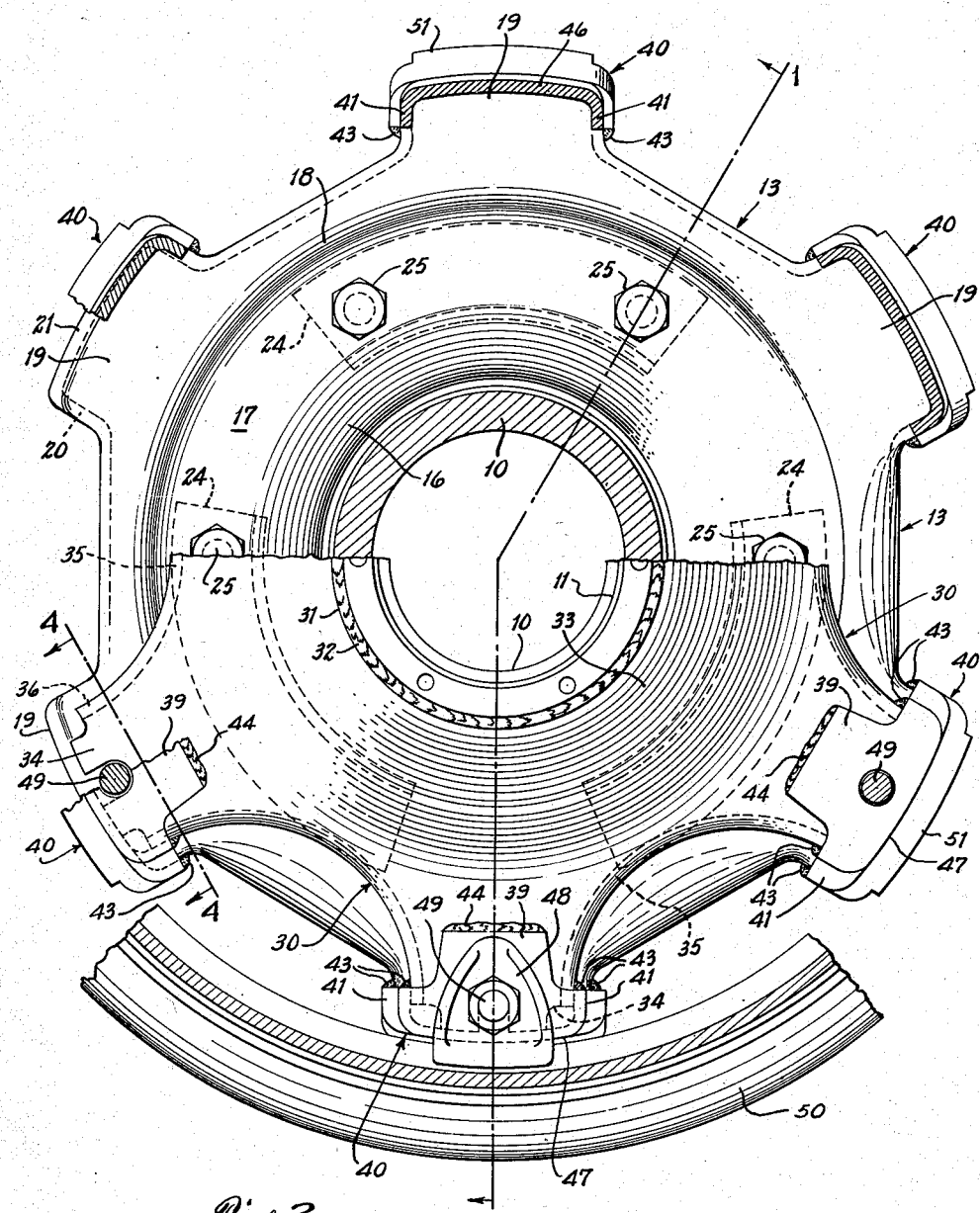
Fig. 2 is a view partly in front elevation and partly in cross section as indicated by the line 2—2 in Fig. 1.

The present invention has for an object the provision of a strong, well balanced and economical vehicle wheel designed to demountably mount a pair of tire carrying rims. Another object is the provision of a heavy duty, dual tired wheel fabricated of a number of parts most of which are of pressed metal, providing a stronger and cheaper wheel than may be afforded by cast or similar conventional wheels. Still another object is the provision of a vehicle wheel equipped with a brake drum, the wheel being so designed as to easily allow assembly of the drum in fabricating the wheel and its later disassembly if necessary.

Referring now to the illustrative embodiment of the wheel of the invention shown by way of example in the accompanying drawings, a hub 10 is provided which may conveniently be a forging or casting with finished seats 11 and 12 to receive suitable bearings whereby the wheel may be mounted for rotation on an axle end. The

2 wheel, in general, is fabricated of said hub and a pair of spaced web or disc elements radially extending therefrom, having peripheral spoke plates mounted thereon and formed to mount a pair of removable tire rims. A brake drum is also provided secured to the axially inner of the wheel webs by bolts extending into the interior space of the wheel.

As shown, the axially inner web designated generally by the numeral 13 is formed of an annular blank of metal pressed into the desired form, providing an inner peripheral, cylindrical portion 14 which is welded as at 15 upon an external finished seat of the hub 10. Immediately radially outwardly of portion 14, the web 13 is formed in a slightly inclined, frusto-conical portion 16 which merges into a flat, annular portion 17 which lies in a plane substantially normal to the axis of the wheel and is designed to form a mounting seat for the brake drum.

Radially outwardly of flat portion 17, the inner web is reversely curved to form an axially extending, strengthening bead 18, which merges into a plurality of radially extending and inwardly axially inclined integral spoke portions 19. Said spoke portions are formed with axially extending edge walls 20 providing a rectangular, open, box-like or U-shaped formation of great strength, and the radially outer ends 21 thereof are further axially turned or inclined to provide seats for the spoke plates hereinafter described.

A brake drum 22 is provided for the wheel, the flange 23 of which is mounted upon flat portion 17 of the inner web by means of a plurality of spacing elements 24 and bolts 25 with cooperating nuts 26, the former of which extend through suitable apertures in the web positioned between the locations of spoke portions 19. A lubricant shield 27 is preferably assembled with the brake drum as shown in order to deflect excess bearing lubricant through the spaces between the drum and web provided by elements 24.

The axially outer web of the fabricated wheel is designated generally by numeral 30 and is mounted adjacent the outer end of the hub 10 in spaced relationship throughout its radial extent with respect to the inner web 13. The web 30 is similarly formed by pressing from an annular blank of metal, and is provided with an inner peripheral cylindrical portion 31 which is positioned on a finished external seat of the hub and secured by an annular weld 32. Radially outwardly of cylindrical portion 31 the outer web is formed in an axially inwardly inclined, frusto-conical portion 33 which merges into a plurality of outwardly radially extending spaced spoke portions 34. Between the spoke portions 34 and radially centrally of the web, the latter is abruptly axially inwardly turned into strengthening flange or web portions 35 of substantial axial extent. Each of the spoke portions is formed with radially extending edge flanges or webs 36 which merge with the adjacent flanges 35, providing a strong, box-like or U-shaped spoke formation integrally formed with strengthening webs between the spokes.

Figures 3, 4, 5:
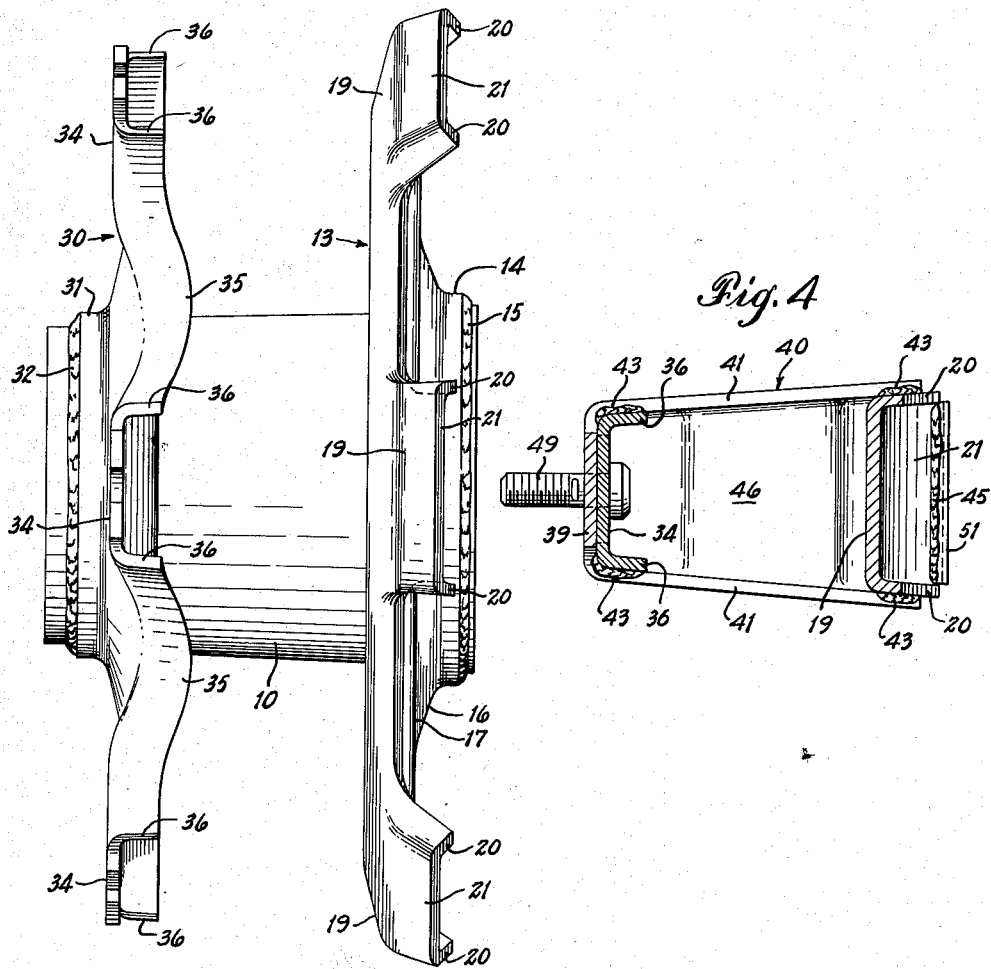
Fig. 3 is a side elevation of the wheel shown in Figs. 1 and 2 at one point in its fabrication before the spoke plates, brake drum, and certain other parts have been assembled.
Fig. 4 is a cross-sectional view taken along line 4—4 of Fig. 2.
Fig. 5 is a detail perspective view of a spoke plate element as shown assembled in the finished wheel in Figs. 1, 2 and 4.

The spoke formations 34 are reversely curved adjacent their radially outer ends as indicated by numeral 37, and are then formed in plane portions 38. As shown, said portions 38 are adapted to receive in abutting relationship the radially extending tabs 39 of curved spoke plate members 40, one of which is shown in detail in Fig. 5 of the drawings. Each plate member 40 is formed by pressing a blank of metal into the shape shown, providing side edge strengthening webs 41 and a front edge web 42 from which the tab 39 extends. The plate members are thus in open, box-like form adapted to be fitted over the tops of spoke formations 34 and 19 of the inner and outer webs respectively, and gusset welds 43 along the bottom edges of webs 41 secure the plates in place. Welding 44 is also preferably employed between the tabs 39 and the outer wheel web, and welding 45 at the rear edges of the plates to the inner wheel web.

The main body portion 46 of each of the spoke plates is formed with a surface 47 toward the outer end thereof to receive a rim lug 48, another portion of which seats on the depending tab 39. Mounting bolts 49 extending through the spoke ends and tabs 39 cooperate with lugs 48 to removably mount an outer rim 50 on the wheel.

The axially inner end 51 of each spoke plate 40 is inclined to seat upon the inclined end portion 21 of an inner spoke formation 19, and the outer surface of said inclined end 51 provides a seat for the mounting edge of an inner tire rim 52. A spacing band 53 between the rims 50 and 52 completes the demountable dual rim assembly upon the vehicle wheel.

In the wheel structure as shown and described it will be apparent that a dual, demountable rim wheel has been provided in which the spaced, pressed webs are formed and positioned so as to afford a strong wheel body and adequately support the load carrying elements. The webs are securely joined at the ends of their spoke formations by sturdy plate elements upon which the rims are mounted. Braking means have also been provided, and they are easily assembled by means of bolts 25. Easy access is afforded to the bolts in assembling or disassembling the drum by the spaced position of the two webs and the individual plate construction, at the spoke ends, with spaces between the spokes to the interior of the wheel. The same construction allows easy exit or removal of dirt or dried mud which may find its way into the wheel between the webs.

The invention in its broader aspects is not limited to the specific mechanisms shown and described but departures may be made therefrom, within the scope of the accompanying claims, without departing from the principles of the invention and without sacrificing its chief advantages.

What is claimed is:

1. A vehicle wheel comprising, in combination, a tubular hub, a pair of web members spaced throughout their radial extent secured to the hub, each said member having integral radially extending U-shaped spoke elements, and an open box-like plate member having a top and side walls extending between respective spoke elements of said web members and secured thereto.

2. A vehicle wheel comprising, in combination, a tubular hub, a pair of web members spaced throughout their radial extent secured to the hub, each said member having integral radially extending U-shaped spoke elements and an open box-like plate member having a top and side walls extending between respective spoke elements of said web members and secured thereto, said plate members having external surfaces for mounting a pair of rims.

3. A vehicle wheel comprising, in combination, a tubular hub, a pair of web members spaced throughout their radial extent secured to the hub, each said member having integral radially extending U-shaped spoke elements, an open box-like plate member having a top and side walls extending between respective spoke elements of said web members and secured thereto, said plate members having external surfaces for mounting a pair of rims and a braking element mounted on the axially inner of said web members.

4. A vehicle wheel comprising, in combination, a tubular hub, a pair of web members spaced throughout their radial extent secured to the hub, each said member having integral radially extending U-shaped spoke elements, an open box-like plate member having a top and side walls extending between respective spoke elements of said web members and secured thereto, said plate members having external surfaces for mounting a pair of rims and a braking element removably mounted on the axially inner of said web members.

5. A vehicle wheel comprising, in combination, a tubular hub, a pair of web members spaced throughout their radial extent secured to the hub, said members having integral outwardly extending U-shaped spoke elements, plate elements having top and side walls extending between respective spoke elements of said web members and supported thereby, said plate elements having exterior surfaces for mounting a pair of rims, and a brake member removably secured to the axially inner of said web members by means extending through said web member at positions between said spoke elements.

6. A vehicle wheel comprising, in combination, a tubular hub, a pair of pressed web members spaced throughout their radial extent secured to said hub, said members being formed with radially extending U-shaped spoke elements, and pressed open box-like plate elements having top and side walls extending between respective spoke elements of said web members and secured thereto.

7. A vehicle wheel comprising, in combination, a tubular hub, a pair of pressed web members spaced throughout their radial extent secured to said hub, said members being formed with radially extending box-like spoke elements and pressed open U-shaped plate elements having top and side walls extending between respective spoke elements of said web members and secured thereto, said plate elements having external surfaces for mounting a pair of rims.

8. A vehicle wheel comprising, in combination, a tubular hub, a pair of pressed web members spaced throughout their radial extent secured to said hub, said members being formed with radially extending U-shaped spoke elements, and pressed open box-like plate elements having top and side walls fitting over the ends of respective spoke elements of said web members and secured thereto.

9. A vehicle wheel comprising, in combination, a tubular hub, a pair of pressed web members spaced throughout their radial extent secured to said hub, said members being formed with radially extending U-shaped spoke elements and axially turned peripheral portions between said spoke elements, and pressed open box-like plate elements having top and side walls extending between respective spoke elements of said web members and secured thereto.

10. A vehicle wheel comprising, in combination, a tubular hub, a pair of pressed web members spaced throughout their radial extent secured to said hub, said members being formed with radially extending U-shaped spoke elements and axially turned peripheral portions between said spoke elements, and pressed open box-like plate elements having top and side walls extending between respective spoke elements of said web members and secured thereto, said plate elements having external surfaces for mounting a pair of rims.

11. A vehicle wheel comprising, in combination, a tubular hub, a pair of pressed web members spaced throughout their radial extent secured to said hub, said members being formed with radially extending U-shaped spoke elements, pressed open box-like plate elements having top and side walls extending between respective spoke elements of said web members and secured thereto, and a brake element demountably mounted on the axially inner web member.

12. A vehicle wheel comprising, in combination, a tubular hub, a pair of pressed, oppositely dished web members spaced throughout their radial extent secured to said hub, said members being formed with radially extending U-shaped spoke elements, and pressed open box-like plate elements having top and side walls extending between respective spoke elements of said web members and secured thereto, said plate elements having inclined and other surfaces for mounting a pair of rims.

CHARLES S. ASH.

REFERENCES CITED

The following references are of record in the file of this patent:

UNITED STATES PATENTS

| Number | Name | Date |
|---|---|---|
| 1,862,218 | Handy | June 7, 1932 |
| 1,908,024 | Keller | May 9, 1933 |
| 2,123,101 | Farr | July 5, 1938 |
| 2,339,859 | Hunt | Jan. 25, 1944 |
| 2,427,378 | Ash | Sept. 16, 1947 |

FOREIGN PATENTS

| Number | Country | Date |
|---|---|---|
| 27,224 | France | 1924 |
| 361,073 | Italy | 1938 |